Sept. 21, 1965     G. A. POTEAT ETAL     3,207,559
ARTICLE COLLECTION SYSTEM
Filed Aug. 23, 1962     6 Sheets-Sheet 1
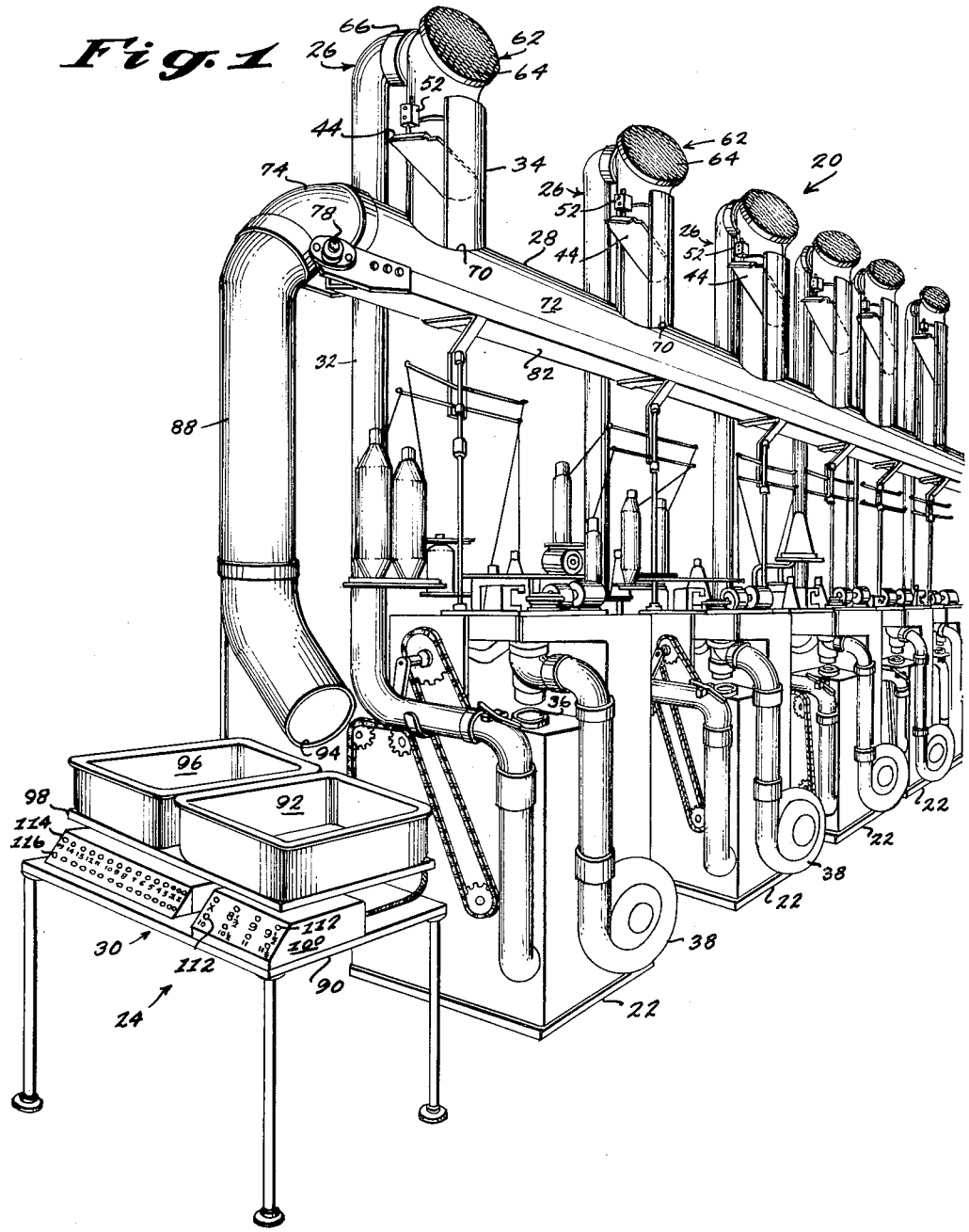
INVENTORS
GEORGE A. POTEAT &
EDMUND B. MORRISON
BY
Channing L. Richards &
Dalbert U. Shefte
ATTORNEYS

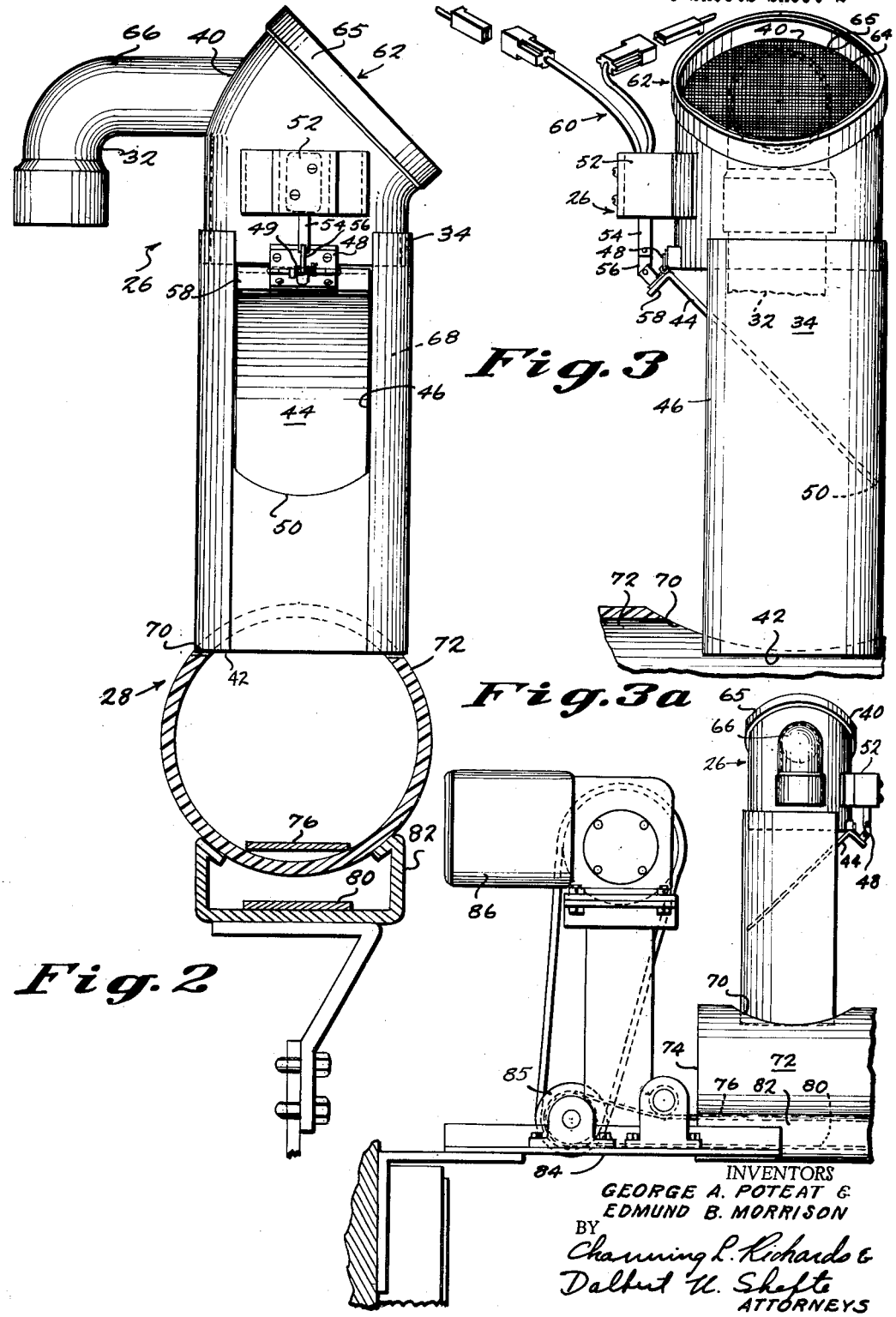

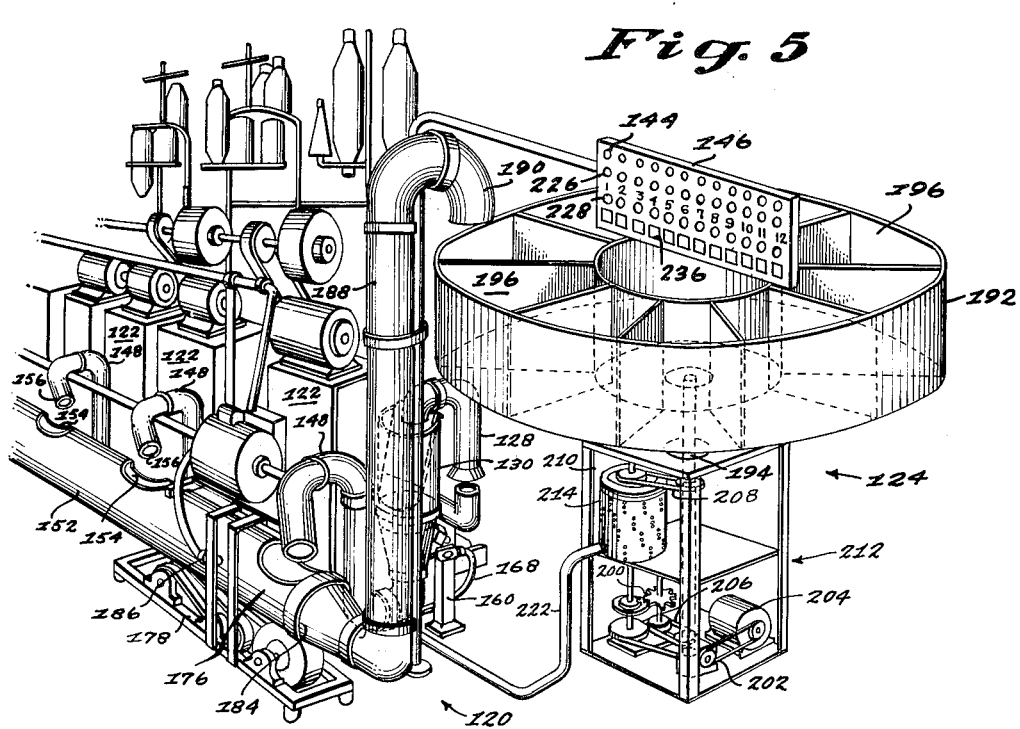
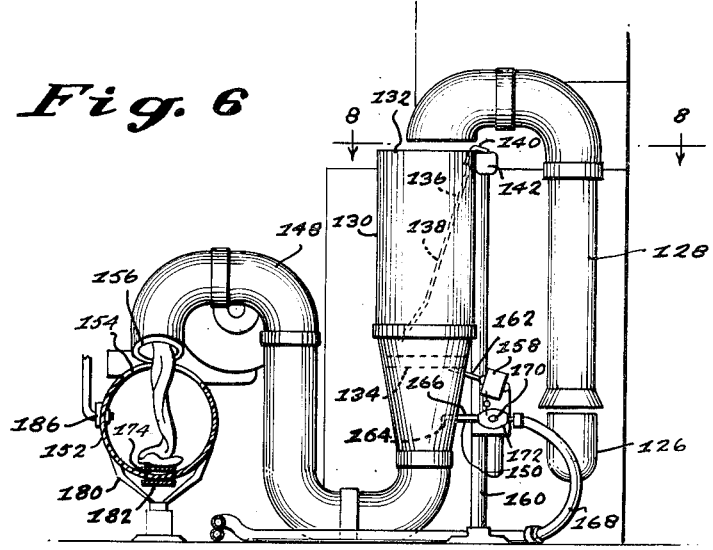

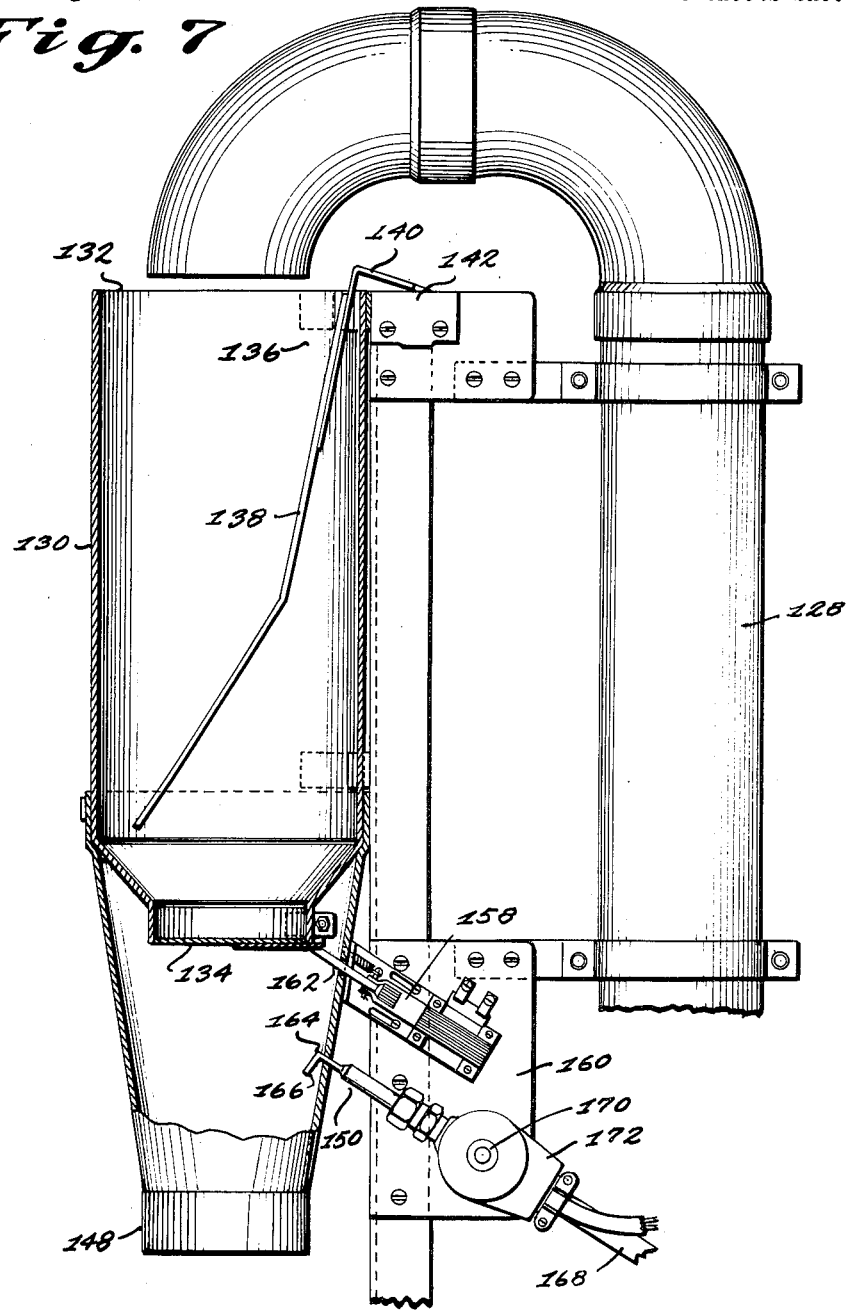

Sept. 21, 1965 G. A. POTEAT ETAL 3,207,559
ARTICLE COLLECTION SYSTEM
Filed Aug. 23, 1962 6 Sheets-Sheet 6

INVENTORS
GEORGE A. POTEAT &
EDMUND B. MORRISON
BY
Channing L. Richards &
Dalbert U. Shefte
ATTORNEYS +# United States Patent Office 3,207,559
Patented Sept. 21, 1965

3,207,559
ARTICLE COLLECTION SYSTEM
George A. Poteat and Edmund B. Morrison, Gibsonville, N.C., assignors to Engineered Plastics, Incorporated, Gibsonville, N.C., a corporation of Delaware
Filed Aug. 23, 1962, Ser. No. 218,996
5 Claims. (Cl. 302—27)

The present invention is directed to an article collection system for collecting articles from a plurality of locations and delivering them to a central station, with the introduction of articles into the system at the individual locations being controlled from a common station, whereby articles may be collected selectively in a desired controlled sequence of selections.

Briefly described, the article collection system of the present invention comprises main conveyor means that transport articles from individual locations to a central collection station with transfer means at each location selectively operable to transfer articles from the location to the main conveyor means, and control means controlling the operation of the transfer means at each of the various locations from a common station and in a desired sequence of selections.

The control from a common station of the operations of the individual transfer means provides convenient and efficient selection and timing of delivery of articles to the central collection station, and thereby facilitates subsequent handling or processing. For example, this controlled selection may be utilized to collect articles in groups whereby a predetermined group of articles is collected at each selection, as where a number of different types, sizes or styles of articles are collected from the various locations and it is desirable to collect like articles together in groups, or where it is simply desired to collect a known number of articles together in each group to expedite handling and processing.

The control means of the present invention may comprise a separate control at the common location for operating each individual transfer means so that the operator can individually select articles from the various locations. This individual selection may also be controlled automatically in a planned sequence.

Further, collection of articles in groups may be obtained by using a series of controls to each of which a number of transfer means are connected so that upon actuation of each individual control articles will be transferred to the main conveyor by each of the connected transfer means. The selection of the sequence of actuation of these group controls can be accomplished manually at the common station, or the actuation can be automatically controlled in a planned sequence. In addition, a particular article collection system may be designed to incorporate a combination of the individual and group controls for alternate operation, and in either or both a manual or an automatic actuation.

In one particular embodiment the article collection system of the present invention is used to special advantage in the production of seamless hosiery for centrally collecting hosiery from a plurality of circular knitting machines. In this manner a single system may be adapted to a multitude of knitting machines that knit various types, sizes or styles of hosiery with the collection being controlled advantageously so that at each sequential selection hosiery from machines knitting the same type, size or style will be collected together, thus automatically sorting the hosiery for convenient further processing and handling. This automatic sorting eliminates the tedious sorting task that is normally performed manually by the operator.

In the collection of lightweight articles, such as the afore-mentioned hosiery, pneumatic means may be included to transport the articles in a portion or in all of the system. In particular, pneumatic means may be incorporated as part of the transfer means to convey initially the articles to a position in readiness for transfer by the transfer means to the main conveyor. As the article collection system of the present invention includes control of the selection of collection, articles must often be retained at individual transfer means to await selected operation of that transfer means. This results in the retained article being subjected to turbulence from the air flow, which causes undesirable agitation, particularly in the case of hosiery.

This agitation resulting from the flow of air against the retained article is minimized in the present invention by air dissipation means which comprise an air permeable section, such as a screen, above the article retaining position and in the path of the air flow that delivers articles to the retaining position. This air permeable section permits the bulk of the transporting air to pass therethrough, thereby allowing the article to drop to the retaining position substantially free of the agitating effect of the air. This air dissipation feature can also be used at the collection station when pneumatic means are used to deliver the articles thereto, so as to minimize the agitating effect of the pneumatic means on the collected articles.

An added feature that may be incorporated in an article collection system according to the present invention to aid the operator in efficiently controlling the delivery of articles from the individual locations, is sensing means provided at the article retaining position of the transfer means for sensing the presence of an article thereat and so indicating to the operator at the central station. With this sensing means the operator can tell when an article has left the transfer means so that he will know the system is functioning correctly. This feature is particularly significant in a vacuum collection system as the effectiveness of the vacuum is substantially reduced when an article is caught in the gate or other retaining member at the transfer means and prevents the gate or other closure to completely close, with the result that air can flow past the gate or closure and thereby materially reduce the vacuum necessary for proper operation. With the sensing means feature of the present invention, the operator simply actuates the transfer means to hold it open until the sensing means indicates that the article is no longer at the retained position so that the gate or closure can be closed completely.

Other and further features and advantages of the present invention will be apparent from the following description and the accompanying drawings, in which:

FIG. 1 is a perspective view of an embodiment of the article collection system of the present invention adapted to a plurality of circular knitting machines to collect hosiery therefrom;

FIG. 2 is an enlarged vertical sectional view of the article collection system of FIG. 1 taken transversely of the system at one of the knitting machine locations;

FIG. 3 is an enlarged front elevational view of the elements of FIG. 2;

FIG. 3a is an enlarged side elevational view of the rear portion of the article collection system of FIG. 1;

FIG. 5 is a perspective view similar to FIG. 1 and illustrating an alternate embodiment of the article collection system of the present invention;

FIG. 6 is a vertical sectional view of the article collection system of FIG. 5 taken transversely of the system at one of the knitting machine locations;

FIG. 7 is an enlarged view of a portion of FIG. 6 shown partly broken away;

Figure 4:
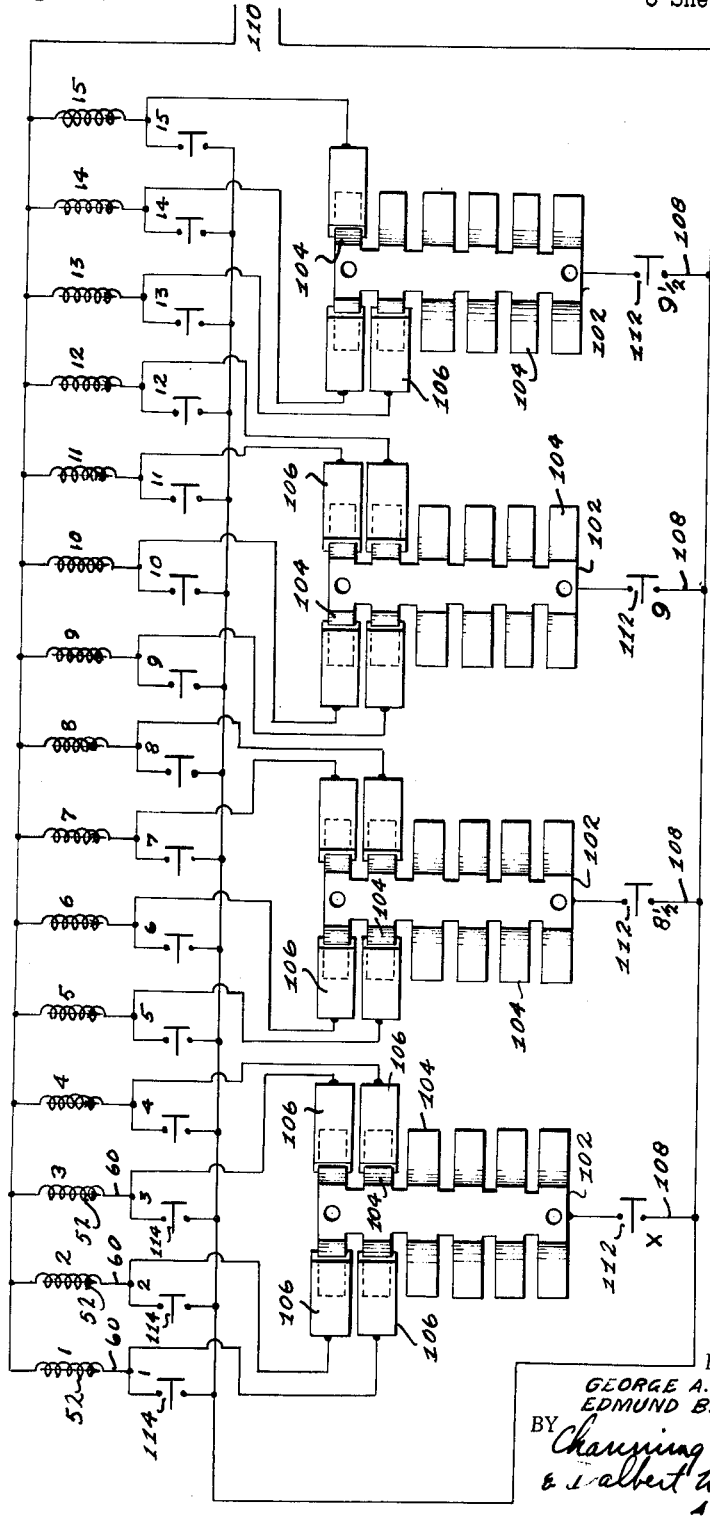
FIG. 4 is a diagrammatic view of the electrical circuitry of the article collection system of FIG. 1.
Figure 8:
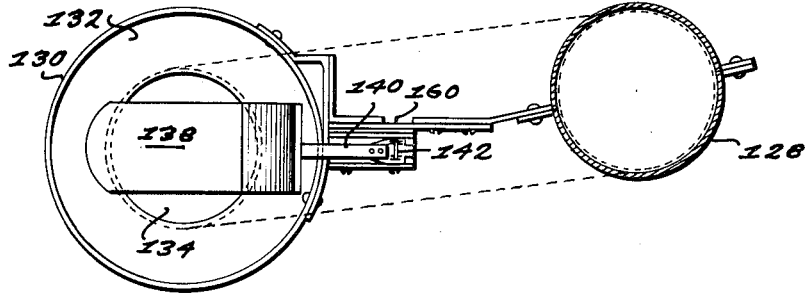
FIG. 8 is a horizontal sectional view taken along line 8—8 of FIG. 6.

An embodiment of the present invention is shown in FIGS. 1 through 4 incorporated in an article collection system 20 adapted to collect hosiery from a plurality of circular knitting machines 22 for delivery to a central collection station 24. In the embodiment illustrated the knitting machines are well-known Singer-Fidelity four-feed machines; however, this invention is adaptable to various other types of knitting machines, as well as to the collection of articles other than hosiery from locations other than knitting machines.

The article collection system 20 illustrated in FIGS. 1 through 4 comprises transfer means 26 at each of the knitting machines 22, which transfer hosiery to main conveyor means 28, which in turn transports the hosiery to the central collection station 24. The operation of the transfer means 26 to transfer articles to the main conveyor means 28 is selectively controlled by control means 30 in any desired sequence of selections as will be described more fully below.

The transfer means 26 comprises a delivery tube 32 through which hosiery articles are transported pneumatically from the knitting machine 22 to a transfer tube 34. In the particular embodiment illustrated the knitting machines 22 include a conventional pneumatic take-down mechanism 36 driven by an air pump 38. The delivery tube 32 is connected to this take-down mechanism 36 with the air from the air pump 38 blowing the hosiery articles through the delivery tube 32 and into the transfer tube 34 through an opening 40 in the top thereof. The transfer tube 34 extends downwardly from the top opening 40 to a discharge end 42 above the main conveyor means 28 and is provided intermediate its ends with article retaining means such as the hinged gate 44, which when closed restricts passage of hosiery thereby. The transfer tube 34 is slotted as at 46 from the hinge connection 48 for the gate 44 downwardly to the discharge end 42 to accommodate downward opening of the gate 44. The gate 44 and associated slot 46 extend across a substantial width of the transfer tube 34. In the particular embodiment illustrated the gate 44 is inclined downwardly when in the closed position and has an arcuately shaped outer end 50 curved to seat against the wall of the transfer tube 34. The gate 44 is retained in a normally closed position by a coiled hinge spring 49 incorporated in the hinge connection 48.

The operation of the gate 44 is controlled by an electrical solenoid mechanism 52 having a piston 54 connected through a linkage 56 to the portion of the hinge 48 that is secured to a flange 58 of the gate 44. The solenoid mechanism 52 is operated by the control means 30 through electrical lines 60 to cause the gate 44 to open. Upon deenergization of the solenoid 52 the gate 44 is biased to its closed position by the spring 49.

In the pneumatic delivery of articles from the knitting machine 22 to the retaining gate 44 considerable turbulence is developed, normally causing undesirable agitation of the articles retained at the gate. To minimize this turbulence the embodiment illustrated includes air dissipation means 62 formed in the transfer tube 34 above the gate 44. The air dissipation means 62 comprises an air permeable section, which in the illustrated embodiment is in the form of a perforated screen 64. This screen 64 is mounted across the upper end 65 of the transfer tube 34 which upper end 65 and screen 64 are inclined downwardly away from the delivery tube 32 with the screen 64 extending substantially across the path of air flow from the horizontal end 66 of the delivery tube 32, which end 66 opens into the aforementioned top opening 40 of the transfer tube 34 for delivery of articles thereinto. With this arrangement of the air dissipation screen 64 the bulk of the air flow from the delivery tube 32 passes out through the screen 64 while the articles, which cannot pass through the screen, drop down onto the retaining gate 44. The little amount of air deflected downwardly with the hosiery article toward the gate 44 is further dissipated by the side spaces 68 between the sides of the gate 44 and the walls of the transfer tube 34. These side spaces 68 are not of sufficient size to permit articles to pass therethrough.

The discharge end 42 of the transfer tube 34 is positioned immediately above an opening 70 in a main conveyor tube 72 of the main conveyor means 28. This main conveyor tube 72 extends along all of the knitting machines 22 below the individual transfer tubes 34 to a discharge end 74 at the central collection station 24.

In the embodiment illustrated the main conveyor tube 72 contains the upper reach 76 of an endless belt that is drawn through the tube 72 to the discharge end 74 thereof to support and transport articles delivered thereto from the transfer tubes 34 to the central collection station 24. At the discharge end 74 of the tube 72 the belt passes over a roller 78 with the lower reach 80 of the belt extending rearwardly below the main conveyor tube 72 through a belt supporting chamber 82 to the rear of the main conveyor tube 72 where the belt passes over a series of rollers 84, one 85 of which is driven by a suitable motor 86.

At the discharge end 74 of the main conveyor tube 72 a discharge tube 88 extends generally downwardly to a collection table 90 to guide the hosiery articles as they leave the belt downwardly into a collection container 92 positioned below the end 94 of the discharge tube 88.

In the embodiment illustrated there are a pair of collection containers 92 and 96 which are supported on a swivel platform 98 pivotally mounted on the collection table 90 for positioning of one or the other of the collection containers 92 and 96 below the discharge tube 88 for collection of articles therefrom.

The collection table 90 also serves as a mounting for the control means housing 100, which contains the control elements of the control means 30 for central operation of the transfer means 26 at the individual knitting machines 22. In the embodiment illustrated in FIGS. 1 through 4, the control means 30 comprises a series of connector plates 102 having a plurality of terminal posts 104 on which sockets 106 at the ends of the connecting wires 60 from the individual transfer means 26 may be attached to connect selected transfer means to a particular connector plate. In FIG. 1 the control panel shows switches 112 for eight such connector plates 102, whereas in the wiring diagram of FIG. 4 only four plates are shown for simplicity. As illustrated in FIG. 4 each of the four connector plates 102 is electrically connected by lead line 108 to a power supply 110 with the operating switch 112 located in line 108 and being normally open. When a switch 112 is closed the circuit of the associated connector plate is energized so that all of the solenoid mechanisms 52 that are connected to the energized connector plate by connecting wires will be actuated to open the associated gates 44 and permit articles retained at the gates to drop into the main conveyor tube 72 and be transported by the upper reach 76 of the belt to the collection station 24.

As illustrated in FIG. 1 the connector plate switches are designated "X," "8½," "9," "9½," "10," "10½," "11" and "11½." The number legends indicate the particular size of hosiery that will be collected when a particular switch button is pressed. The "X" indicates some special style of hosiery that will be collected when that switch button is pushed. In this arrangement the transfer means 26 at each knitting machine 22 is connected to the connector plate 102 controlling the particular style or size hosiery being knit by that machine so that upon pushing the button designating that particular style or size the transfer means will be operated to deliver all such size or style hosiery to the collection station.

When the size or style of hosiery being knit at a particular knitting machine is changed, the transfer means can be connected to the proper connector plate by attaching the socket 106 of the connecting wire 60 to a terminal post 104 on the proper connector plate 102. Similarly, the legends for the push button switches can be changed as desired to properly indicate the size or style hosiery collected upon pushing the particular button. Thus the presently described control means may be easily modified as desired to obtain any collection combination.

In addition to the above described arrangement of the control means to collect articles in groups, the control means of this embodiment includes means for operating the transfer means individually as seen in the wiring diagram of FIG. 4 and the series of push button switcthes 114 mounted on the collection table 90 in FIG. 1. These individual push button switches 114 are connected in parallel with the group control connections of the connector plates 102 so that the individual transfer means can be operated independently of the group control to cause an individual hosiery article to be delivered to the collection station.

With this versatile control means the operator can control delivery of articles in groups of like articles or individually in any desired sequence or combination. When a selected group or a selected individual article is delivered through the discharge tube 88 of the main conveyor tube 72 into the collection container 92, the platform 98 can be pivoted to position the other container 96 in position for receipt of the next group or individual article while the operator removes the collected articles from the previous container or substitutes another empty container therefor.

The illustrated embodiment of the article collection system of FIGS. 1 through 4 also includes machine stop controls for each individual knitting machine with a series of stop push buttons 116 mounted on the collection table 90 for easy actuation by the operator to stop any of the individual knitting machines to permit repair or inspection or for some other desired reason.

An alternate embodiment of the present invention is incorporated in the article collection system 120 illustrated in FIGS. 5 through 10. As in the previously described embodiment the article collection system 120 of FIGS. 5 through 10 is shown adapted to a plurality of circular knitting machines 122 for the collection of hosiery at a central collection station 124. The knitting machines 122 are similar to the knitting machines 22 of the above described embodiment and include similar takedown mechanisms 126, which blow the hosiery from the machines through delivery tubes 128 into the open upper ends of retaining tubes 130.

Each of the retaining tubes 130 has a lower end that converges to a central opening 132 normally closed by a control gate 134, for collection and retention of hosiery in the retaining tube 130 until the control gate 134 is opened.

Figure 9:
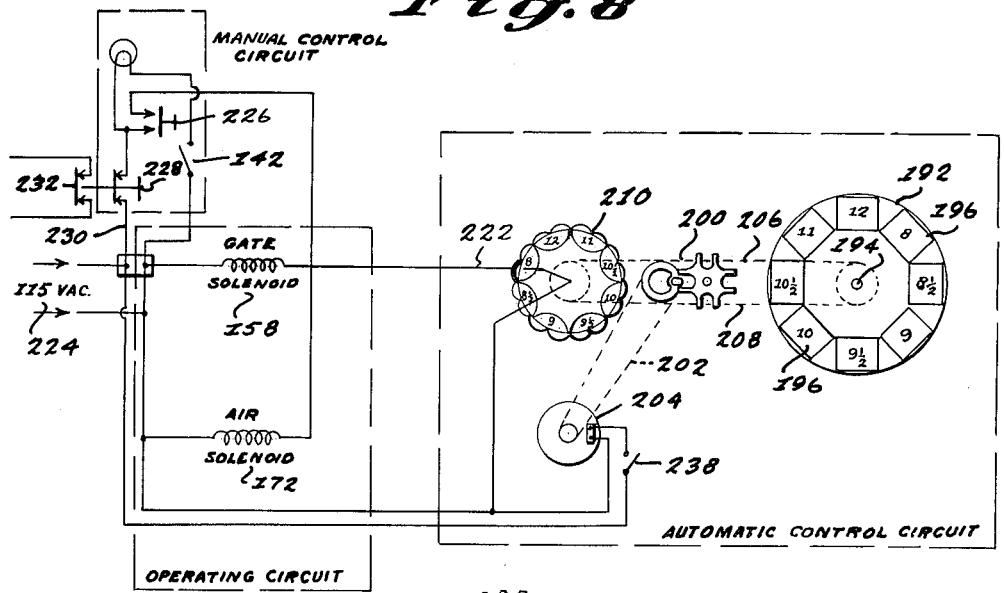
FIG. 9 is a diagrammatic view of the electrical circuitry of the article collection system embodiment of FIG. 5.
Figure 10:
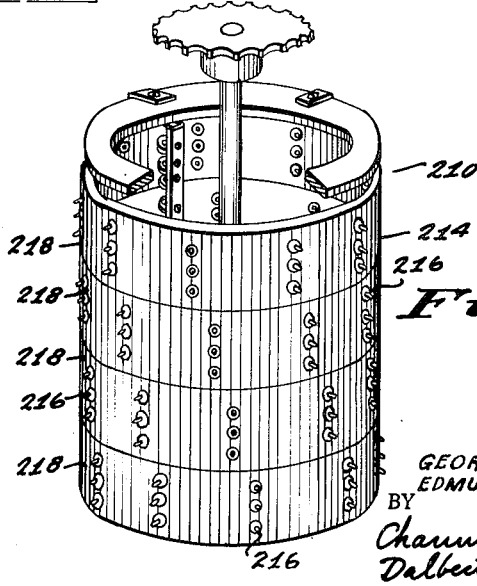
FIG. 10 is a perspective view, partially broken away, of the cylindrical cycle timer switch incorporated in the embodiment of FIG. 5.

In this embodiment sensing means 136 are provided to sense the presence of articles in the retaining tubes 130. These sensing means comprise flat feeler arms 138 that extend downwardly into and across the retaining tubes 130 to a point near the bottom thereof. These feeler arms 138 are of sufficient width so that hosiery articles cannot pass out of sensing contact therewith while the control gates 134 are closed. The feeler arms 138 are pivotally mounted at their top ends 140 at the top edge of the retaining tubes 130. These top ends 140 of the feeler arms 138 are connected to microswitches 142 or similar electrical contacts in a manner to close the switches 142 upon pivoting of the feeler arms 138 under the weight of hosiery articles retained in the retaining tubes 130. As seen in FIG. 9, each microswitch 142 is connected in series with a signal light 144 mounted in a control panel 146 at the central collection station 124 (see FIG. 5) so that an operator can determine from the signal lights 144 when an article is in particular retaining tube 130 and when an article has been discharged therefrom.

The articles are discharged from the retaining tubes 130 by opening the control gates 134, whereupon the hosiery articles drop into transfer tubes 148 and are blown therethrough by air jet means 150 into a main conveyor tube 152, which extends along the plurality of knitting machines 122 and has opening 154 directly below the discharge ends 156 of the transfer tubes 148.

The control gates 134 are operated by electrical solenoid mechanisms 158 mounted on brackets 160 outwardly of both the retaining tubes 130 and transfer tubes 148 and having operating arms 162 extending through the walls of the transfer tubes 148 to support the control gates 134 in normally closed positions. Upon electrical energization of the solenoid mechanisms 158 the arms 162 are retracted, thereby permitting the control gates 134 to fall open and permitting the passage of retained articles from the retaining tubes 130 into the transfer tubes 148.

The transfer of articles past the control gates 134 is enhanced by suction created by the air jet means 150, which comprises air nozzles 164 extending into the transfer tubes 148 directly below the solenoid arms 162 and having orifices 166 directing air downwardly through the transfer tubes 148 away from the control gates 134. This not only creates a vacuum to facilitate drawing of articles into the transfer tubes 148, but more importantly provides air jets to blow articles through the transfer tubes 148 into the main conveyor tube 152.

Air pressure is supplied to the air nozzles 164 from a supply (not shown) through air conduits 168 and valves 170 mounted on the aforementioned brackets 160 outwardly of the transfer tubes 148. The valves 170 are operated by valve solenoids 172 which open the valves 170 upon energization of the solenoids.

The main conveyor tube 152, which receives articles from the transfer tubes 148, supports the upper reach 174 of an endless conveyor belt that travels through the main conveyor tube 152 to the central collection station 124 for transportation of articles thereon to the collection station. At the forward end 176 of the main conveyor tube 152 the belt passes over a system of pulleys 178 and into a supporting chamber 180 mounted below the main conveyor tube 152 and which carries the lower reach 182 of the conveyor belt rearwardly to a drive pulley (not shown) similar to that described and illustrated with regard to the first discussed embodiment.

As seen in FIGS. 5 and 6, the main conveyor tube 152 is near the floor on which the knitting machines are supported. This requires raising of the articles at the discharge end 184 of the main conveyor tube 152, which is accomplished in this embodiment by a discharge air jet 186 spaced slightly rearwardly of the discharge end 184 of the main conveyor tube 152 and directing a blast of air forwardly to pick up articles from the upper reach 174 of the conveyor belt and blow them upwardly through the discharge tube 188, which is curved to form a downwardly opening upper end 190 from which articles are discharged into a container 192 at the central collection station 124.

The container 192 illustrated in FIG. 5 is in the form of a circular, radially compartmented, turntable supported on and rotated by an axial shaft 194 for positioning of radial compartments 196 below the discharge and 190 of the discharge tube 188. Removable containers may be placed in the compartments 196 for ease of handling of the collected articles.

The turntable container 192 is intermittently advanced by means of a Geneva-motion mechanism 200 driven through suitable drive means 202 from a drive motor 204.

In the embodiment illustrated the Geneva-motion mechanism 200 is a four-step mechanism and drives the turntable shaft 194 through a two to one reduction drive 206 to provide an eight-step advancement of the turntable container 192, which is divided into eight radial compartments 196. Thus during each revolution of the turntable each radial compartment 196 will be positioned for receipt of articles from the discharge tube 188.

The turntable shaft 194 is also utilized to intermittently advance through appropriate belt connection 208 a cylindrical cycle timer switch 210, which forms part of control means 212 for automatically controlling the operation of this article collection system 120 to collect articles in a selected sequence of articles or groups of articles.

The cylindrical cycle timer switch 210 comprises a stationary outer cylindrical body having a plurality of circumferentially spaced electrical contacts 216 thereon. The cylindrical body 214 is formed in a plurality of angularly adjustable cylindrical sections 218 to permit relative positioning of the contacts 216. In the embodiment illustrated the electrical contacts 216 are arranged in eight groups circumferentially spaced about the cylindrical body 214. A rotary switch bar 220, driven by the aforementioned turntable shaft connection, advances intermittently to make contact in sequence with the groups of electrical contacts 216, to which are connected electrical wires 222 leading to the gate solenoids 158 and valve solenoids 172 at the individual retaining tubes 130 and transfer tubes 148 associated with each knitting machine 122 for controlled operation of the control gates 134 and air jet means 150 in a selected pattern determined by the particular electrical contacts 216 of the cylindrical timer switch 210 to which the associated electrical wires are attached.

The operation of the control means 212 to effect selected sequential collection of articles is illustrated in the wiring diagram of FIG. 9, which illustrates the controls for operating the control gate solenoid 158 and air valve solenoid 172 at one of the knitting machines 142. These solenoids 158 and 172, respectively, are connected in parallel between a power source 224 and a contact 216 on the cylindrical timer switch 210. When the switch bar 220 is intermittently advanced by the drive motor 204 to a position in contact with electrical contact 216 the solenoid circuit is closed energizing the gate solenoid 158 and the valve solenoid 172, thereby opening the control gate 134 so that articles at the particular knitting machine will drop into the transfer tube 148 and be blown therethrough by the air jet means 150 into the main conveyor tube 152, which will convey them to the turntable container 192 for receipt in an appropriate compartment 196 thereof.

The controls for the other knitting machines are connected to other of the electrical contacts 216 with the controls from all machines knitting the same size or style being connected to a single contact so that all of the contacts will be engaged by the switch bar 220 at the same time for collection of articles of the same size or type in each compartment 196 of the turntable container 192.

By this system articles are efficiently collected in groups of like sizes or styles with the containers compartments 196 being labelled to indicate to the operator which size or style has been collected in each compartment or container.

In addition to the automatic control circuit indicated by the dash lines at the right in FIG. 9 and the operating circuit indicated by the dash lines at the lower left of FIG. 9, this embodiment includes a manual control circuit for each knitting machine collection, which circuit is indicated by the dash lines at the upper left of FIG. 9. This manual control circuit includes the sensing means microswitch 142 connected in series with the signal light 144 so that upon closing of the microswitch 142 upon sensing of hosiery in the associated retaining tube 130 the signal light 144 will glow and indicate to the operator the presence of an article in the retaining tube. The manual control circuit also includes a control switch 226 connected to the control gate solenoid 158 and air valve solenoid 172, by-passing the cylindrical timer switch 210. This manual control switch 226 is normally open, but is closable by the operator to energize the control solenoids 158 and 172 to collect articles from the particular knitting machine. In this manual collection the operator watches the signal light 144 and maintains the manual operating switch 226 closed until the signal light no longer glows, thus indicating that the articles in the particular retaining tube have been discharged and are being collected.

The manual control circuit also includes a stop switch 228 in the main line 230, which stop switch 228 is normally closed but which may be opened by the operator to de-energize the circuit. This stop switch 228 is a double switch that is also connected in the main power supply line to the particular knitting machine as indicated at 223 so that when the switch is opened to de-energize the manual operating circuit it also opens the power circuit to the knitting machine and stops the knitting cycle thereat.

The signal light 144, manual control switch 226 and stop switch 228 may all be conveniently mounted on the control panel 146 at the central collection station 124. The light and switches for each machine are arranged together on the panel 146 with the elements for the different machines arranged sequentially as indicated by the numbers on the panel 146 for convenient reference by the operator. Below these machine numbers are legend spaces 236 for indication of the size or style hosiery being knit at the particular machine, also for convenient reference by the operator.

From the above it is apparent that in this embodiment the article collection system 120 may be automatically operated through the control means 212 to deliver articles in any selected automatic sequence either individually or in groups, or the collection system may be operated manually by the operator by opening a switch 238 in the drive motor 204 circuit, which deactivates the automatic control, and then controlling the collection through the switches of the manual operating circuit.

The present invention has been described in detail above for purposes of illustration only and is not intended to be limited by this description or otherwise except as defined in the appended claims.

We claim:

1. An article collection system for collecting articles selectively from a plurality of locations, said system comprising main conveyor means for transporting articles to a collection station, tubes at each said location through which articles are transferred to said main conveyor means, an openable gate in each said tube for normally closing the tube for retention of articles therein, article sensing means in each said tube in advance of said gate for sensing the presence of an article at said gate and continuing such sensing until the article has passed through said gate, indicating means responsive to said sensing means for indicating at a common station the presence of articles in the tubes at each location, and control means actuatable at a common location for selectively opening said gates to effect selective collection of articles.

2. An article collection system for collecting articles selectively from a plurality of locations according to claim 1 and characterized further in that each said sensing means comprises a feeler arm pivoted in said tube for pivotal displacement upon contact by an article, and said indicating means are responsive to said feeler arm displacement.

3. An article collection system for collecting articles selectively from article manufacturing machines at a plurality of locations, said system comprising main conveyor means for transporting articles to a collection station, transfer means at each of said locations for receiving articles from said machines and retaining them at said locations and operable to transfer articles from said locations to said main conveyor means, control means actuatable at a common station for selectively operating the transfer means at said locations to effect selected transfer of articles to said main conveyor means, and receiving means at said collection station for receiving articles from said main conveyor means and selectively positionable in correspondence with said selected transfer of articles to maintain selected separation of articles.

4. An article collection system for automatically collecting articles from article manufacturing machines at a plurality of locations in a predetermined sequence, said system comprising main conveyor means for transporting articles to a collection station, transfer means at each of said locations for receiving articles from said machines and retaining them at said locations and operable to transfer articles from said locations to said main conveyor means, receiving means at said collection station for receiving articles from said main conveyor means and selectively positionable to provide separation of articles received from said main conveyor means, and automatic control means automatically controlling sequentially from a common station operation of said transfer means and said receiving means in a predetermined sequence of selections to effect sequential collection of articles separated in correspondence with the sequential selections.

5. An article collection system for automatically collecting articles from a plurality of locations in a predetermined sequence according to claim 4 and characterized further in that said receiving means comprises a circular, radially compartmented, container rotatable to position selectively the compartments thereof for receipt of articles from said main conveyor means with rotation of said container automatically controlled by said control means in relation to control of said transfer means.

References Cited by the Examiner

UNITED STATES PATENTS

| | | | |
|---|---|---|---|
| 1,597,438 | 8/26 | Ennis | 302—2 |
| 1,818,367 | 8/31 | Wallace | 302—59 |
| 2,706,136 | 4/55 | Hughes | 302—27 |
| 2,727,734 | 12/55 | Vincent | 214—16 |
| 2,858,125 | 10/58 | Clenny | 302—53 |
| 2,994,561 | 8/61 | Kelley | 302—27 |
| 3,001,669 | 9/61 | Tandler | 221—12 |
| 3,157,439 | 11/64 | Salmona | 302—27 |

SAMUEL F. COLEMAN, *Primary Examiner.*

ANDRES H. NIELSEN, *Examiner.*